United States Patent [19]
Murphy

[11] Patent Number: 5,186,821
[45] Date of Patent: Feb. 16, 1993

[54] WASTEWATER TREATMENT PROCESS WITH COOPERATING VELOCITY EQUALIZATION, AERATION AND DECANTING MEANS

[75] Inventor: D. Thomas Murphy, 35 Walaka P-109, Kihei, Hi. 96753

[73] Assignee: D. Thomas Murphy, Kihei, Hi.

[21] Appl. No.: 753,860

[22] Filed: Sep. 3, 1991

[51] Int. Cl.⁵ .................. B01D 17/12; B01D 21/24; B01D 21/30
[52] U.S. Cl. .................................... 210/86; 210/104; 210/109; 210/122; 210/134; 210/139; 210/141; 210/221.1; 210/221.2; 210/237; 210/519; 210/532.2; 210/540
[58] Field of Search ............... 210/104, 109, 119, 139, 210/141, 143, 170, 220, 237, 248, 519, 532.1, 532.2, 241, 258, 221.1, 221.2, 86, 121, 122, 134, 242.1, 540

[56] References Cited

U.S. PATENT DOCUMENTS

| | | | |
|---|---|---|---|
| 2,140,059 | 12/1938 | Simonsen | 210/519 |
| 4,230,578 | 10/1980 | Culp et al. | 210/104 |
| 4,278,541 | 7/1981 | Eis et al. | 210/519 |
| 5,104,528 | 4/1992 | Christie | 210/532.1 |

Primary Examiner—Joseph W. Drodge

[57] ABSTRACT

A wastewater treatment system is disclosed which utilizes only one fiberglass tank which has no compartments but includes a first flow equalization collector surrounded by a cylindrical partition which vertially eliminates hydraulic turbulence and creates a pre-strat zone. A novel floating decanter is disclosed and programmable circuitry including timing of aeration, liquid levels and decanting processes with the results of producing a quality supernatent affluent heretofore unavailable in such a simple system.

20 Claims, 3 Drawing Sheets

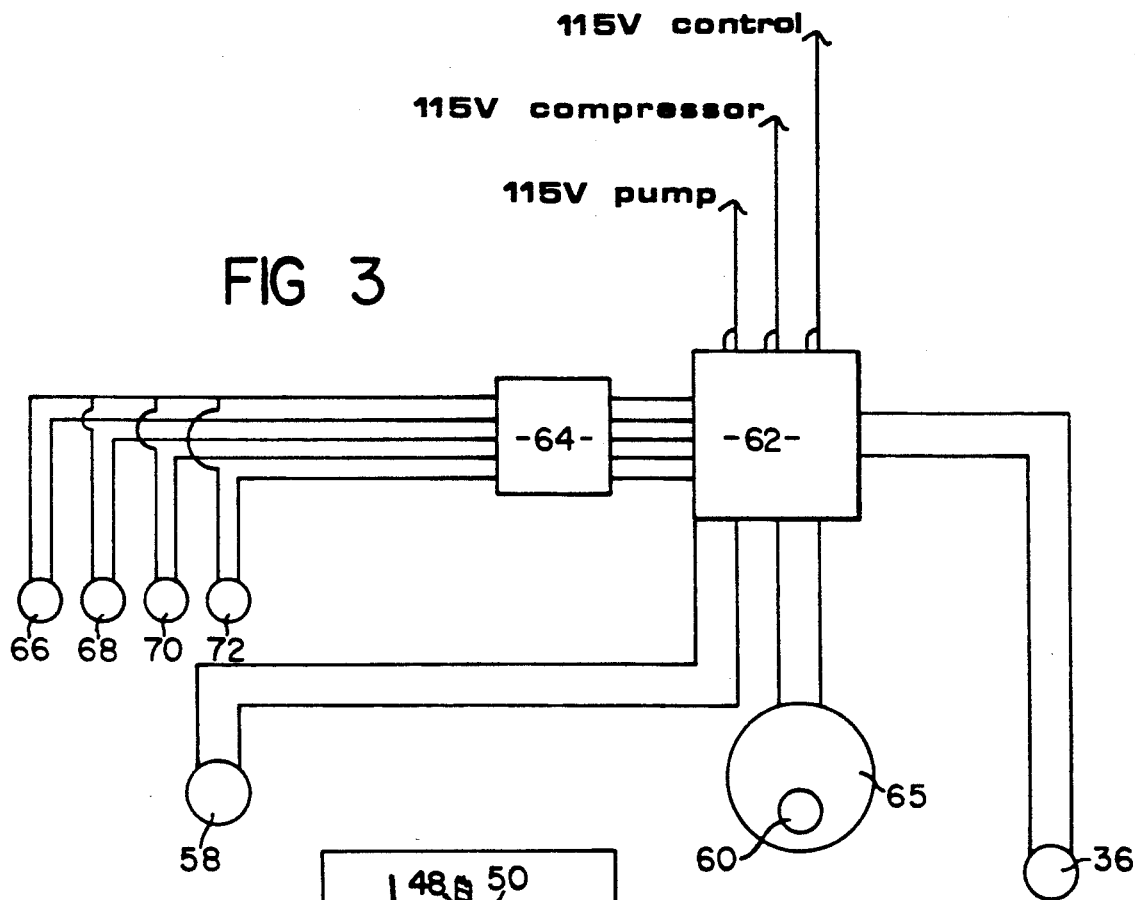

WASTEWATER TREATMENT PROCESS WITH COOPERATING VELOCITY EQUALIZATION, AERATION AND DECANTING MEANS

FIELD OF THE INVENTION

This invention relates to sewage treatment and more particularly to a system involving a basin or tank containing a cyclic operation which includes air diffusion of solids, liquid separation and then liquid decanting.

BACKGROUND OF THE INVENTION

The migration of people and industry to areas beyond public sewers has resulted in the mass use of septic tanks. Lacking efficient equipment, little could be done to counteract the capacity of the soil to accept sewage waste or the effect these wastes have on sub-surface ground water commonly used by home and community as "clean" drinking water. There are a great many septic tank and associated tile field failures. Foul smelling, germ laden sewage is often forced to the surface in and around inhabited areas, and well water contamination has resulted in many areas.

Septic tanks are anaerobic wastewater treatment systems having many disadvantages. Today, many conventional single homes are employing aerobic wastewater treatment systems which are designed to meet accepted criteria relative to load factors, retention times, aerates and the like. Load fluctuations in these single homes require that one exert close control and maintenance to insure good treatment. As a result, many sanitary engineering agencies have discouraged the use of single home aerobic treatment systems. Accordingly, a wastewater treatment system that provides the compartmentation, hydraulic flows and oxygen necessary to optimize the aerobic processes and which does not have the disadvantages of a septic tank is needed in the marketplace.

The disadvantages of the well-accepted septic tank anaerobic system, that is, bacterial action without the presence of oxygen, is as follows; Underground sewage disposal systems, such as septic tanks, have raw sewage entering the tank, which is concrete, through a submerged inlet pipe. Within the tank, biochemical action converts some of the sewage solids to liquid form and others to gas. Three levels of sewage result. Solids sink to the bottom and form a sludge layer. Oily materials, which are lighter than water, float to the top and form a scum layer which is disposed upon the balance of the liquid, namely effluent, which occupies most of the volume of the system. Such systems are disposed in holes without any space between the dirt and the walls, in order to prevent any possible rupture due to pressure buildup. The location of the sewage system may be marked at the ground surface just above the pump out opening. When the sludge layer has built up to a sufficient amount, it becomes necessary for a professional septic tank cleaner crew to pump out the contents of the tank. Due to the nature of a septic tank system, it is possible that the sludge and scum materials could back up through the home sewer system from the inlet pipe. Periodic cleaning of the sewage tank can be costly, but is, of course, necessary in that basically a septic tank is a batch process disposal system.

Improvements have been made in the waste disposal art by the design of fiberglass septic tanks to replace concrete units. The waste disposal art has also moved toward an aerobic-type system, such a system being disclosed in U.S. Pat. No. 3,834,536 to Kelsey. The present invention addresses these and other problems inherent in such systems and solves problems heretofore unsolved in the prior art.

SUMMARY

Following are definitions of some of the terms as used in this application;

I.V.E.C.: Influent Velocity Equalization Collector.
C.F.C.R.: Continuous Feed Cyclic Reactor.
D.O.: Dissolved Oxygen.
D.D.F.: Daily Design Flow (24 Hr. average-peak flow 1 hr.).
INFLUENT: Incoming waste water.
EFFLUENT: Outgoing waste water.
DECANT: Pour off gently.
SUPERNATENT: (Natent) Specifically floating in water.
BOD5: Biological Oxygen Deman.
STORM: Unusual heavy load of influent.
M.L.S.S.: Mixed Liquid Suspended Solids.
T.S.S.: Total suspended solids.

The present invention is a sewage treatment process which may be hereafter referred to as I.D.E.A. "C.F.C.R" which is an acronym for "Intermittent Decant Extended Aeration Continuous Feed Cyclic Reactor" and incorporates CONTINUOUS FEED activated sludge technology with intermittent CYCLIC system operation requiring only a SINGLE BASIN. The system uses a single tank (reactor basin), preferably made of fiberglass in which the activated sludge is aerated over a number of pre-determined cycles. Solids/liquid separation occurs during the air-off part of the cycle. During the latter part of the air-off cycle treated effluent is decanted or withdrawn from directly below the liquid surface. Influent inflow is continuously accommodated at all times. In this way, the functions of flow equalization, biologicial oxidation, nitrification, denitrification, secondary sedimentation and aerobic sludge digestion are all carried out in a single vessel. The duration of a cycle is specific to each design application and variable in the field as required.

The Continuous Feed Cyclic Reactor (C.F.C.R.) Process of the I.D.E.A. System combines SBR, ICEAS, and Continuous Flow activated sludge and extended aeration principles. It is a fill and draw system which accommodates continuous feed (influent) to the tank (reactor basin). The heart of the process lies in the activated sludge blanket which reduces the BOD5(biological oxygen demand) and TSS (total suspended solids) and removes nitrogen and phosphorous in the absence of polymers or filters. Food to microorganism rations (F:M) may vary from 0.04 to 0.3 LB of BOD5/LB of MLSS/Day and mixed liquor suspended solids (MLSS) design concentrations range from 2,000 to 15,000 mg/L. Actual practice has shown MLSS concentrations in the 2.000 to 8,000 mg/L range to be most effective. With a hydraulic retention time (HRT) targeted for 18-36 hours and a sludge age (SRT) of at least 20 days, the Intermittent Decant Extended Aeration (A.D.E.A.) System is sized according to extended aeration standards. With such design parameters, typical excess solids (waste sludge) production ranges from 0.5 to 1.0 LB/LB of BOD5 removed. The sludge produced is quite stable with an 02 uptake rate of less than 10 mg/L 02 /gm MLSS/hr.

One of the major process advantages of the Intermittent or Cycled Extended Aeration Process (EPA Design Manual "Onsite Wastewater Treatment and Disposal Systems", Oct. 1980.) used in the I.D.E.A. System is it provides nitrification/denitrification in addition to carbonaceous BOD5 reduction and solids removal without the addition of methanol as an organic carbon source. The sludge bed acts as an internal organic carbon source. In addition, denitrification enhances alkalinity recovery. This prevents a pH drop which could contribute to filamentous growth and bulked sludge. Alkalinity recovery is particularly advantageous in regions of low natural alkalinity.

It is this unique cyclic process which allows the I.D.E.A. System to accomplish nitrification and denitrification. During aeration, biological oxidation and mixing occur. Blower sizing typically provides for 1.4 to 1.6 LBS of O2/LB of BOD applied/day. For very low strength waste, 20 SCFM/1000 CF reactor volume is provided for mixing. During aeration, excess oxygen is present, and Nitrosomonas sp. oxidize the Ammonia Nitrogen (N/NH3) to Nitrite Nitrogen (N/NO2). Nitrobacter sp. further oxidize the Nitrite Nitrogen (N/NO2) to Nitrate Nitrogen (N/NO3). Both of these are naturally occurring bacteria as a result of this Intermittent or Cycled Extended Aeration "CFCR" Process.

Nitrate, Nitrite, Ammonia and Organic Nitrogen are all inter-related in wastewater. All of these forms of Nitrogen, as well as Nitrogen Gas, are biochemically interconvertible. Ammonia is generally found in large quantities in fresh domestic wastewater, however, Nitrate is found only in small amounts. But in the effluent of conventional nitrifying biological treatment plants, Nitrate is found in concentrations of up to 50 mg/L Nitrate Nitrogen. Nitrite is an intermediate state of Nitrogen, both in the oxidation of Ammonia to Nitrate and in the reduction of Nitrate to Nitrogen Gas. Such oxidation occurs in the I.D.E.A. System.

During non-aerated periods (sedimentation and decantation), the Dissolved Oxygen (DO) level in the sludge blanket (MLSS) approaches zero. The lack of molecular oxygen (O2) encourages Pseudomonas sp. and other denitrifying bacteria to attack the oxygen bound up in the Nitrate (NO3) molecules. The bacteria then reduce the Nitrate (NO3) molecules to Nitrogen (N2) and Oxygen (O2). The molecular Nitrogen (N2), a gas, is released to the atmosphere, while the bacteria utilize the liberated Oxygen (O2). Thus, alternation of oxic and anoxic periods in the I.D.E.A. basin promotes Ammonia Nitrogen (N/NH3) removal from the waste stream of 95% or better.

Additional nitrogen removal is accomplished through assimilation (absorption and incorporation) of nitrogen into bacterial cell mass in satisfaction of metabolic needs. This nitrogen is removed from the system when excess sludge is wasted from the I.D.E.A. basin. Actual operating data have shown the concentration of nitrogen in the sludge mass to be between 5% and 8% by weight of the dry solids. As can be seen, the nutrient removals and high degree of treatment characteristic of tertiary treatment systems can be had at the cost of an I.D.E.A. "CFCR" secondary treatment system.

It is therefore a primary object of the present invention to provide an improved wastewater treatment system.

It is another object to provide a wastewater treatment system which requires only a single basin or multiple basins in parallel to meet the requirements of each specific application.

It is yet another object to provide within the single basin an Influent Velocity Equalization (IVE) collector which by nature of its design completely diffuses influent flow velocities of $Q_{max}$ 7, therefore mitigating hydraulic turbulence that could cause possible upset of the MLVSS during the settle and decant phase of the operation cycle.

It is another object to provide a circular partition to surround the IVE collector which is suspended above the basin floor and extends substantially to the top of the basin to provide a pre-stratification zone through which only solids of a settled nature are allowed to pass through in order to accomplish influent degradation and organism selection through prestratifications.

Still another object is to provide a main aeration section in the basin including an air supply system, such as a motor driven blower or compressor to supply air to a plurality of subsurface air diffusers arranged within the tank and preferably located close to the bottom of the basin.

Yet another important object is to provide a surface floating decanter arranged to decant supernatent from below the surface of the liquid level held within the basin, located at a specific distance from the tank's opposite end equal to substantially one half the distance from the decanter to the pre-stat partition and by virtue of it's location cuts the inner tank rapid current velocities substantially in half, thus, enhancing the supernatent quality and treatment ability of this invention.

Still another object is to provide a programmable timer to program a sequence of aeration, settlement and decant cyclic operations which a typical operational strategy might consist of aeration for 50% of the time, settle for 25% of the time and decant for the remaining 25% of the time.

Another object is to provide floating switches which are adjustable in height.

Still another object is to provide a manway to house the compressor, timer, control panel, etc. which is available to the workman.

It is a further object to provide an access cover substantially over the IVE collector for emergency cleanout.

Still another object is to dispense with both primary and secondary clarifiers, associated return sludge pumping facilities and skimmers. Since the reactor basin also serves as clarifiers, additional clarifiers are not required.

Another object is to eliminate odors related to conventional clarifiers.

Still another object is to eliminate separate sludge holding tanks and sludge recycle systems.

Yet another object is to provide means to remove Biological Phosphorous by altering the operating schedule at the programmable controller and timer.

Still another object is to reduce or eliminate the problem of short circuitry and sludge "wash-out".

Other objects and advantages such as low oxygen requirements, improved nitrification and denitrification, reduced power usage during low flow and long idle periods, improved settling, less sludge wasting, minimum operator attention, heat conservation, shock BOD5 loads which do not lead to drastic population shifts, reduced capitol investment, construction and operational costs, will become apparent when taken into consideration with the following drawings and specifications.

BRIEF DESCRIPTION OF THE DRAWINGS

FIG. 3 is a general schematic of the system.

FIG. 4 is an exploded perspective view of the decanter.

DETAILED DESCRIPTION OF THE DRAWINGS

Figure 1:
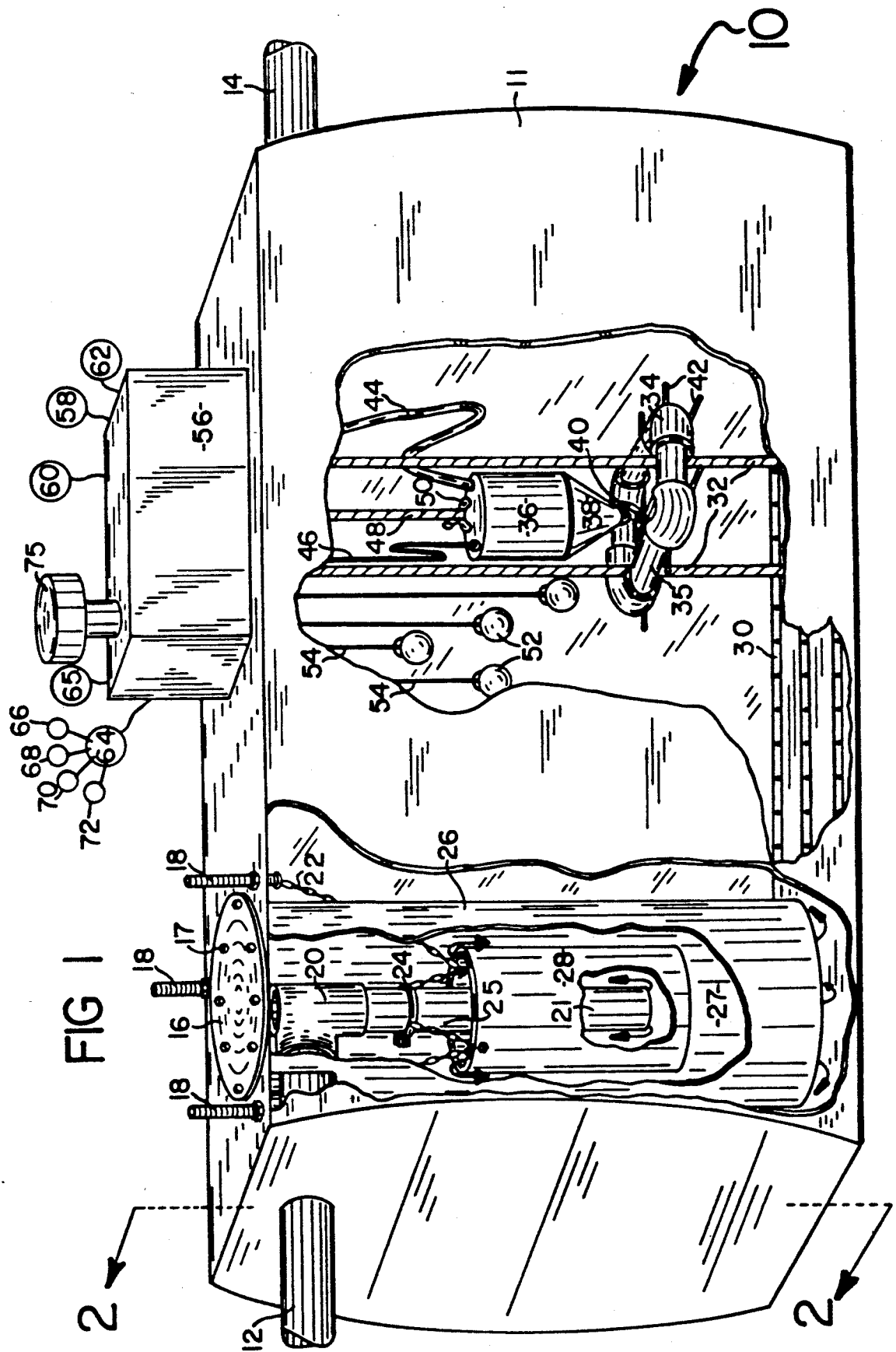
FIG. 1 is a partially cut-a-way perspective view.
Figure 2:
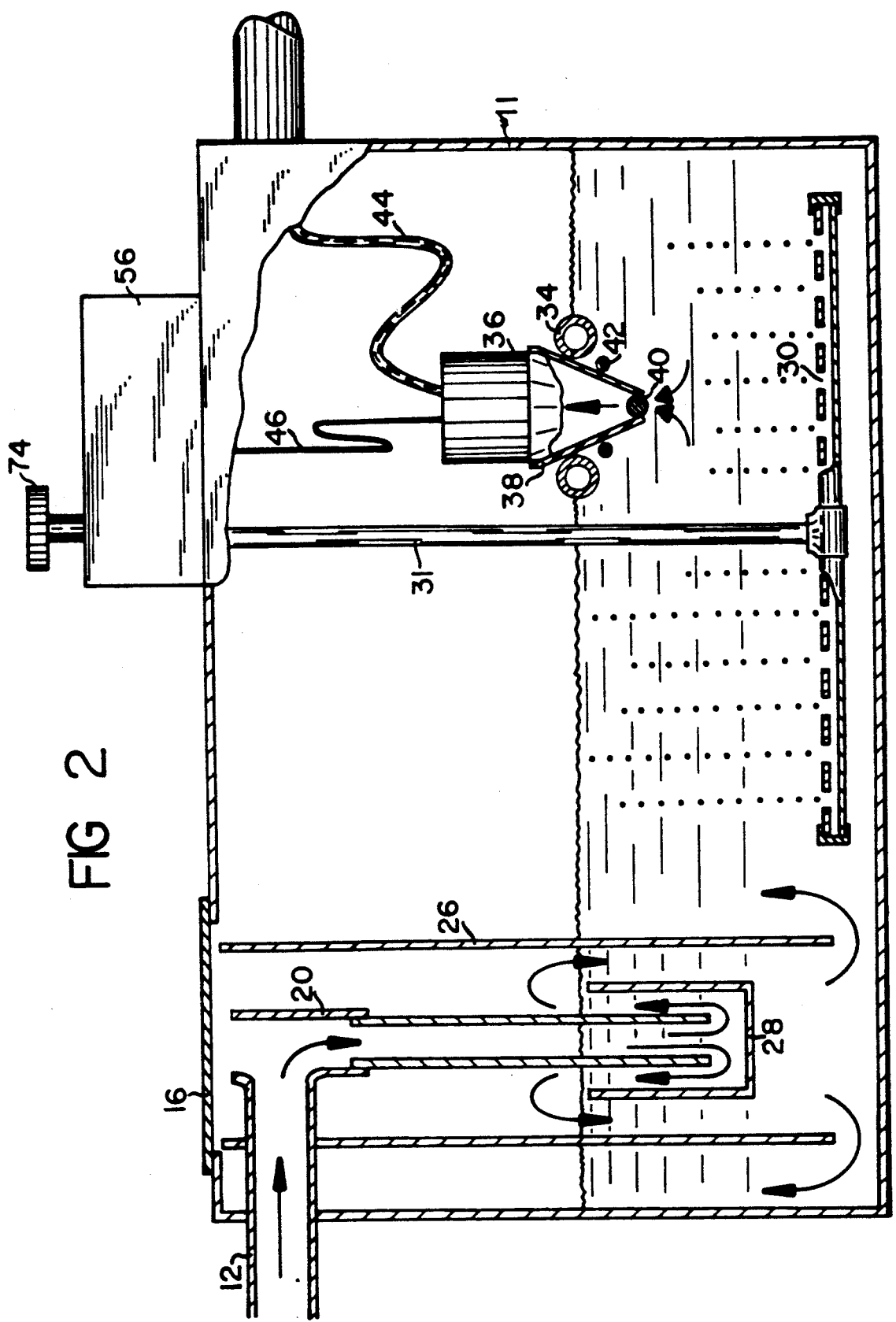
FIG. 2 is substantially a section taken at 2—2 of FIG. 1.

Referring now in detail to the drawing wherein like characters refer to like elements throughout the various drawings, 10 is a general overview of the invention with 11 being a basin or tank made of a material such as fiberglass with it's length being substantially longer than it's width or height while 12 is an influent delivery system such as a pipe to deliver influent through pipe tee 20 and pipe section 21 into substantially the bottom section of chamber or collector 28. Collector 28 is adjustable in relation to section 21 by guide ring 24 and suspension chains 25 with 26 being a circular partition adjustably suspended above the floor of basin 11 by chains 22 and adjustable mounting bolts 18 with 16 being an access cover and being secured by fasteners 17. Circular partition 26, being larger in circumference than collector 28, creates a pre-stratification zone 27 while 30 are multiple air diffusers connected to drop pipe 31 with the upper end of drop pipe 31 being suitably connected (not shown) to a prior art conventional air compressor 58 (not shown) which is mounted within the manway 56.

32 are ropes or guide lines suitably anchored to the bottom of the basin (not shown) with their upper ends terminating within the manway, (not shown) and act as guides and locating means for the floating decanter base section 35 and elbows 34, with 36 being a submersible motor and suction pump with 38 being a funnel shaped sleeve made of a suitable material such as rubber with it's large open end cooperating with motor and suction pump 36 to provide a seal and it's lower smaller end having a smaller opening cooperating with a ball 40 which acts as a check valve. 42 is a mounting frame made of plastic pipe or other non-corrosive material with 4-way tees 78 being suitably bonded to sections forming a framework substantially in the shape of crossing railroad tracks, with 75 being an above ground manway cover air-vent. Frame 42 is secured to pipe frame 35 by means such as screws 74, through screw holes 76 with screws 74 being suitably sealed into pipe frame 35 to allow frame 35 to be water tight.

44 is a flexible hose suitably connected to the output of motor and pump 36, with 46 being a submersible power cable and 48 being a rope or cable suitably attached to handle 50 of motor and pump 36. The flexible hose 44 is also suitably connected at it's distal end (not shown) to the effluent output pipe 14, and the distal end of rope or cable 48 terminating inside the manway 56, (not shown).

52 are multiple floats housing suitable switches, such as mercury switches, 66, 68, 70 and 72 respectively, with the floats 52 being adjustably suspended (not shown) from inside the manway 56 by ropes or power cables 54. 60 is a programmable timer suitably mounted on a suitable control panel 65 (not shown) with 62 being a junction box and 64 being a relay junction box.

It will now be seen that we have provided a wastewater treatment system substantially consisting of a single tank, an influent delivery system, an influent velocity equalization collector within the tank into which the incoming influent is first deposited with the collector being surrounded by a circular partition suspended above the tank floor and substantially extending from the bottom to the top of the tank, thus, providing a pre-stratification zone through which only solids of a settled nature are allowed to pass through, aeration means in the main tank, subsurface air diffusers, a floating decanter to decant supernatent from below the surface of the liquid level, an optimum location for the floating decanter, multiple floating switches which are adjustable in height, a programmable timer, a manway, and an access cover located substantially above the I.V.E. collector, whereby, the various named elements cooperate together to provide a minimum of hydraulic turbulence and a maximum quality of supernatent affluent, even in the event of excessive input of influent.

Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

Having described our invention, what we claim as new and desire to secure by letters patent is:

1. A wastewater treatment system comprising; a tank, said tank being capable of holding a liquid, said tank having a top, a bottom floor, four walls and containing, at least in part: aeration means, air diffusions means, decanting means, system means for receiving influent delivery, collector means for collecting influent and equalizing influent velocity and an access cover, said tank mounting a manway, said system also having a programmable timer and control switch means responsive to multiple liquid levels in said tank, including at least a selected maximum and a selected minimum level, said collector means being closed on it's bottom end, said collector means having a bottom section adjacent said bottom end, said collector means being open on it's top end, said influent delivery system terminating in substantially said bottom section of said collector means, a partition, said partition being of a size larger than and surrounding said collector means and providing a space between said partition and said collector means, said partition being open on it's top and bottom ends, said partition being suspended above said bottom floor of said tank, said partition extending substantially from said bottom floor to said top of said tank, said decanting means being arranged for decanting supernatant from below the levels of said liquid, said timer, said switch means, said decanting means and said aeration means having cooperating associated circuitry arranged to provide intermittent cyclic operation, whereby, said tank, said aeration means, said air diffusion means, said aeration means, said air diffusion means, said decanting means, said switch means, said timer, said associated circuitry, said manway and said access over cooperate together to provide a minimum of hydraulic turbulence and a maximum quality of supernatant effluent even in the event of excessive above average influent input.

2. The wastewater treatment system of claim 1 in which said tank is made of fiberglass.

3. The wastewater treatment system of claim 1 in which said influent delivery system is pipe sections and a pipe tee.

4. The wastewater treatment system of claim 1 in which said influent velocity equalization collector means is of a circular configuration.

5. The wastewater treatment system of claim 1 in which said partition is of a circular configuration.

6. The wastewater treatment system of claim 1 in which said influent velocity equalization collector means has means to allow it to be raised or lowered so as to provide an adjustable relationship with said influent delivery system.

7. The wastewater treatment system of claim 6 in which said adjustable relationship is provided by multiple chains.

8. The wastewater treatment system of claim 1 in which said partition has means to allow it to be raised or lowered to provide an adjustable relationship with said tank.

9. The wastewater treatment system of claim 8 in which said adjustable relationship is provided by multiple chains.

10. The wastewater treatment system of claim 1 in which said aeration means includes a compressor.

11. The wastewater treatment system of claim 1 in which said aeration means includes a blower.

12. The wastewater treatment system of claim 1 in which said air diffusing means are multiple pipes located horizontally, substantially at the bottom of said tank and suitably connected through drop pipes to said aeration means.

13. The wastewater treatment system of claim 1 in which said decanting means is a floating decanter.

14. The wastewater treatment system of claim 13 in which said floating decanter includes an electric motor and suction pump.

15. The wastewater treatment system of claim 1 in which said floating decanter means has guide means in substantially a vertical plane.

16. The wastewater treatment system of claim 15 in which said guide means are ropes.

17. The wastewater treatment system of claim 15 in which said guide means are cables.

18. The wastewater treatment system of claim 1 in which said decanter is positioned at a specific distance from the tank's end furthest from the partition equal to approximately one half the distance from the decanter to the partition.

19. The wastewater treatment system of claim 1 in which said control switch means comprise mercury switches.

20. The wastewater treatment system of claim 1 in which said access cover is located above said collector means.

* * * * *